United States Patent [19]

Mayer et al.

[11] 4,255,173

[45] Mar. 10, 1981

[54] LEAD FILTER FOR INTERNAL COMBUSTION ENGINE EXHAUST GASES

[75] Inventors: Edward A. Mayer, Newburgh, N.Y.; John T. Brandenburg, Port Neches, Tex.

[73] Assignee: Texaco Inc., White Plains, N.Y.

[21] Appl. No.: 865,106

[22] Filed: Dec. 27, 1977

[51] Int. Cl.³ .......................... B01D 50/00; F01N 3/02
[52] U.S. Cl. .................................. 55/329; 55/501; 55/518; 55/524; 55/526; 55/DIG. 30; 55/418; 422/179
[58] Field of Search ................. 55/316, 319, 320, 322, 55/329, 501, 512, 518, 524, 525, 526, DIG. 30, 418; 23/288 F; 60/299, 311

[56] References Cited

U.S. PATENT DOCUMENTS

| | | | |
|---|---|---|---|
| 3,295,919 | 1/1967 | Henderson et al. | 55/DIG. 30 |
| 3,434,806 | 3/1969 | Rycke et al. | 23/288 F |
| 3,495,950 | 2/1970 | Barber et al. | 55/DIG. 30 |
| 3,530,649 | 9/1970 | Porsch et al. | 55/316 |
| 3,615,233 | 10/1971 | Doering | 55/512 |
| 3,695,851 | 10/1972 | Perga | 23/288 F |
| 3,719,457 | 3/1973 | Nagamatsu | 60/299 |
| 3,802,163 | 4/1974 | Riojas | 55/316 |

FOREIGN PATENT DOCUMENTS 2313557  12/1976  France ........................ 55/DIG. 30

*Primary Examiner*—David L. Lacey
*Attorney, Agent, or Firm*—Carl G. Ries; Robert A. Kulason; Henry C. Dearborn

[57] ABSTRACT

An automobile type exhaust gas lead filter is particularly applicable to diesel engine smoke reduction. It has a tubular housing with alumina coated metal wire fibers as the filter bed, which is centrally located. There are open spaces forming plenums at the ends of the housing. And, the inlet and outlet pipes have baffles in alignment therewith to prevent direct impingement of exhaust gases on the coated wire. Also, the baffles are spaced from the inside ends of the pipes to minimize pressure drops.

1 Claim, 5 Drawing Figures

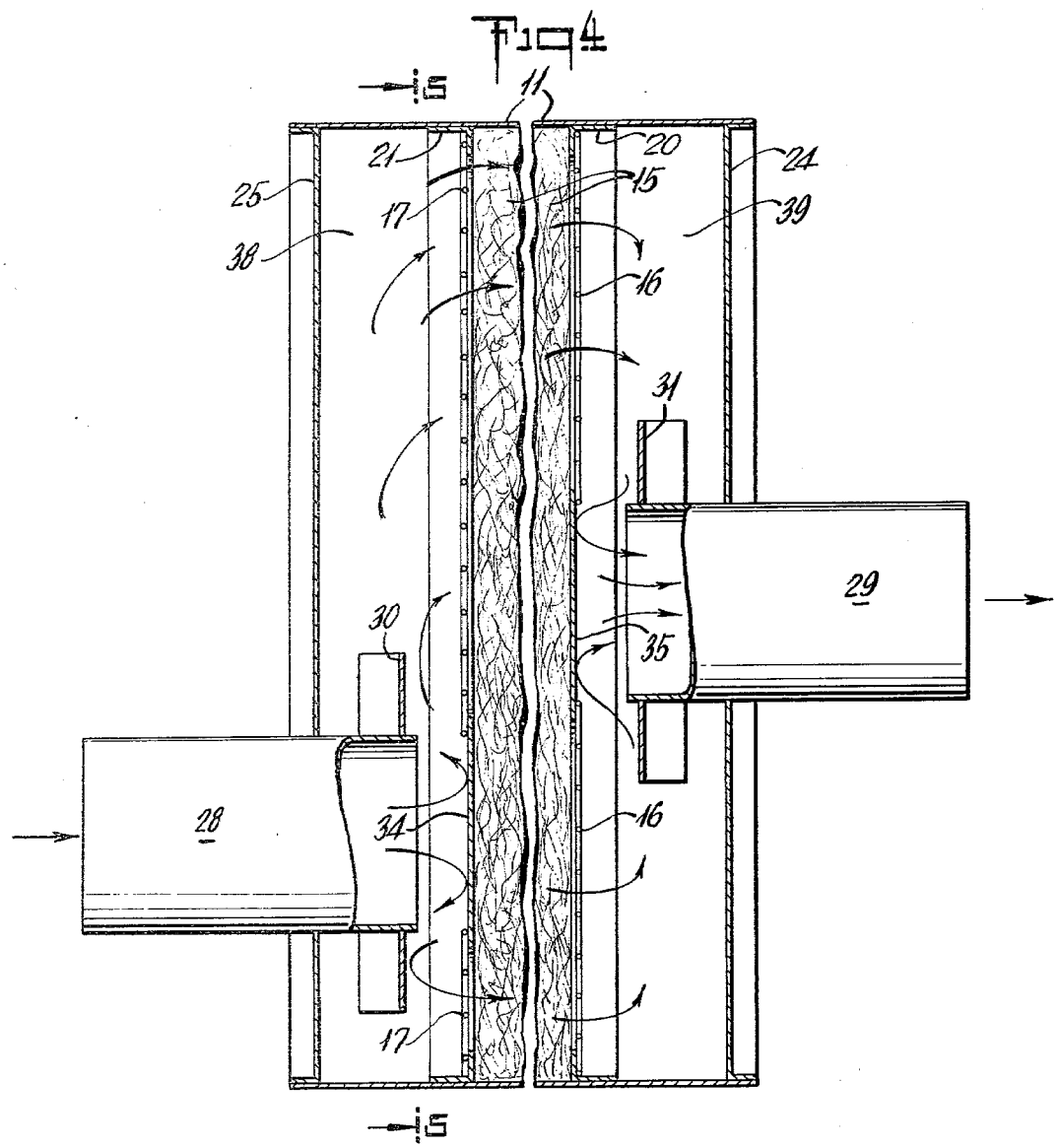
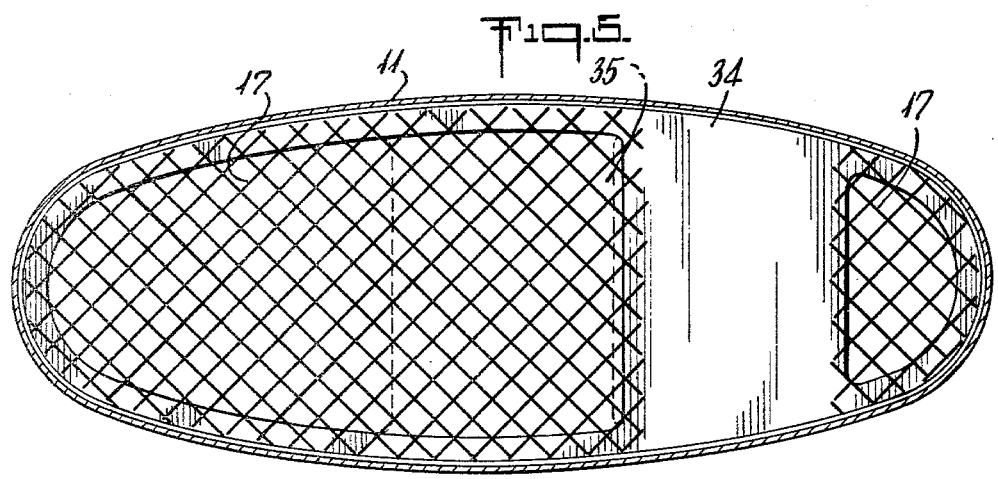

LEAD FILTER FOR INTERNAL COMBUSTION ENGINE EXHAUST GASES

BACKGROUND OF THE INVENTION

1. Field of the Invention

This invention concerns a lead filter for automotive engine exhaust systems.

2. Description of the Prior Art

While an exhaust gas conditioning method and apparatus have been disclosed in a patent to Ruth, U.S. Pat. No. 2,773,735 issued Dec. 11, 1956, that clearly lacks the advantages of a filter according to the applicant's invention. Thus, the Ruth patent has a complicated structure that appears quite impractical for use on an automobile. Furthermore, while there are so-called catalytic mufflers now in use, insofar as the applicants are aware, they fail to provide the advantages according to this invention.

SUMMARY OF THE INVENTION

Briefly, the invention concerns an automobile type lead filter, which comprises in combination an elongated housing having a mass of alumina coated metal wire centrally located therein. It also comprises mesh support means across the interior of said housing at the ends of said mass, and inlet and outlet pipes located on the ends of said housing. It also comprises impervious baffle means adjacent to said mesh support means and aligned with the inner ends of said pipes.

Again briefly, the invention concerns an automobile type lead filter that comprises in combination an elongated housing having an oval cross sectional shape and containing a mass of alumina coated steel wool centrally located therein. It also comprises a pair of mesh supports extending transversely across the interior of said housing at the ends of said mass, and an inlet pipe located at one end of said housing with the axis offset from the longitudinal axis of the housing. It also comprises an outlet pipe located at the other end of said housing with the axis aligned with the longitudinal axis of the housing, and a pair of impervious baffles integrally attached to said mesh supports and each being aligned with one of said inlet and outlet pipes. The said baffles are spaced from the inside ends of said pipes to minimize pressure drop thereat. The filter also comprises a pair of plenums one at each end of said housing between said mesh supports and the end walls of the housing. The said inlet and outlet pipes extend through the end walls of the housing and have support means adjacent to the inside ends of the pipes.

Once more briefly, the invention concerns a lead filter for use in the exhaust system for filtering exhaust gases of an internal combustion engine. It comprises an elongated tubular housing having an oval cross section, and a mass of alumina coated steel wool filling most of said housing centrally thereof. It also comprises centrally located means for stiffening said housing to maintain said oval cross section, and an open mesh support on each end of said mass for holding it in place and extending transversely across said housing. It also comprises impervious material ends on said housing spaced from said open mesh supports to form a plenum at each end of said housing, and inlet and outlet pipes extending through said housing ends for carrying said exhaust gases therethrough and terminating in said plenums. It also comprises means for supporting the inner ends of said pipes relative to the walls of said housing, and impervious material baffles aligned with said pipes and integrally mounted with said open mesh supports and spaced from the inner ends of said pipes to minimize pressure drops of said exhaust gases.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 4 is a somewhat less enlarged longitudinal cross section, showing the ends of the filter as taken along the lines 4—4 of FIG. 2; and FIG. 5 is a transverse cross section, taken along the lines 5—5 of FIG. 4 and looking in the direction of the arrows.

DESCRIPTION OF THE PREFERRED EMBODIMENT

Figure 1:
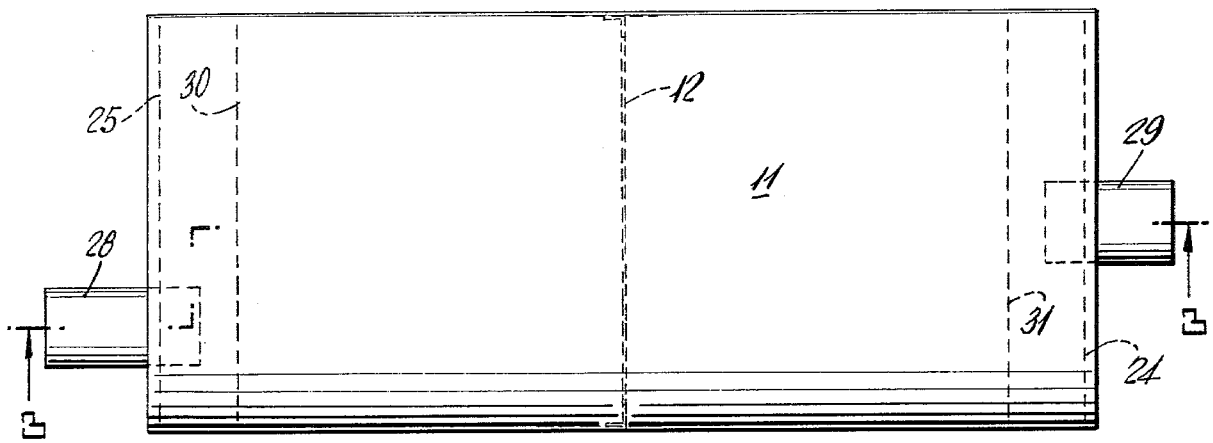
FIG. 1 is a plan view of a filter according to the invention.
Figure 2:
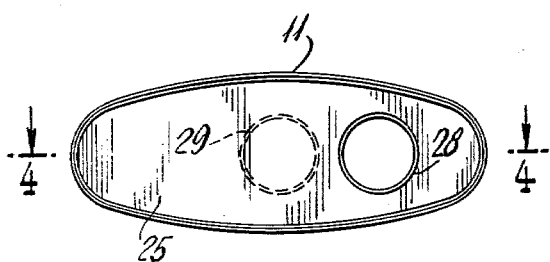
FIG. 2 is an end elevation of the filter taken from the left hand end as viewed in FIG. 1.
Figure 3:
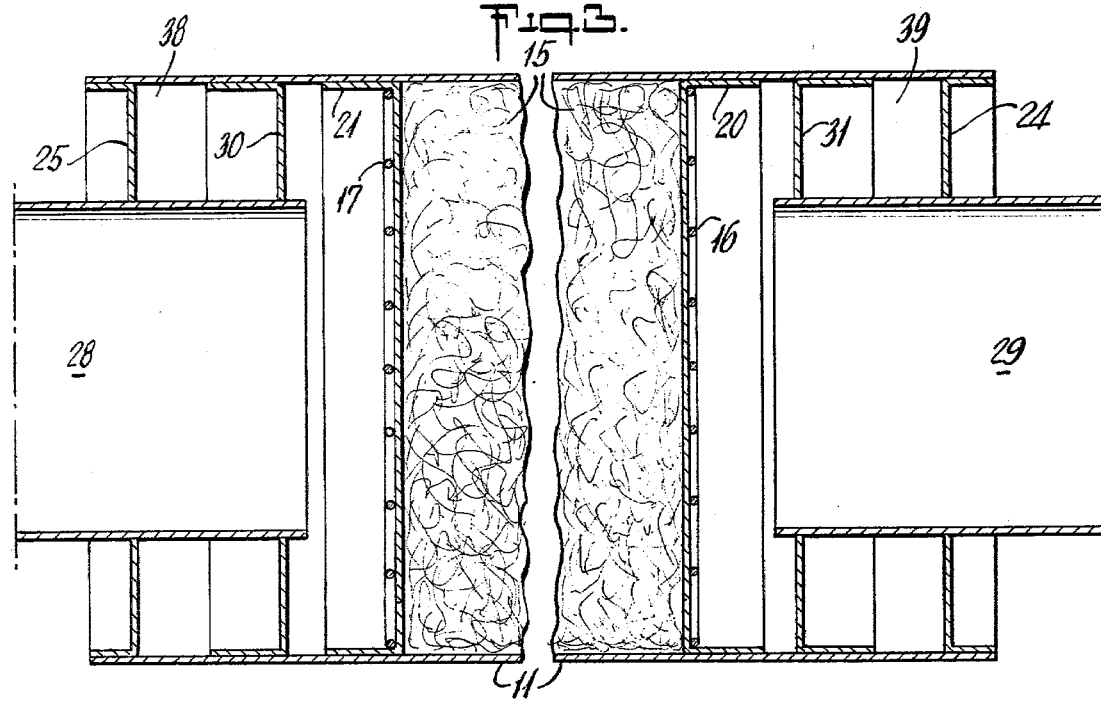
FIG. 3 is an enlarged cross section, showing the ends of the filter as taken along the lines 3—3 of FIG. 1.

The drawings illustrate a preferred form of the invention. It includes an elongated housing 11 which is constructed of sheet material that is impervious to the exhaust gases which will be passing therethrough. It has an oval cross sectional shape, as clearly shown in FIGS. 2 and 5, and there is an angle member 12 near the center, that is securely attached in any feasible manner, e.g. by welding, to the inside of the housing 11. It provides a stiffening support for the housing structure to maintain the desired oval shape.

There is a mass of alumina coated steel wool 15 that fills most of the central portion of the housing 11. There are open mesh supports 16 and 17 located at the ends of the mass 15 of steel wool. These supports hold the steel wool filter bed in place. These open mesh elements 16 and 17 may take various forms, such as screening or expanded metal sheets. They are held in place inside the housing 11 by being attached, in any feasible manner, to a pair of angle members 20 and 21 respectively.

The angles 20 and 21 are, of course, attached in a feasible manner to the inside of the housing 11, e.g. by tack welding or the like. The housing 11 has impervious material end panels 24 and 25 which are fastened to the housing in a manner similar to the angles 12, 20 and 21. However, the end panels 25 and 24 have inlet and outlet pipes 28 and 29 respectively, mounted therethrough for connecting the entire filter into an exhaust system, in order to filter exhaust gases from an internal combustion engine. These pipes are supported by brackets 30 and 31 respectively, which attach the inner ends to the housing 11 for providing stiffening and support to the pipes.

There are baffles 34 and 35 that are attached integrally with the open meshes 17 and 16 respectively. These baffles are located spaced away from the inner ends of the inlet and outlet pipes 28 and 29, a considerable distance. This arrangement provides for minimum pressure drop as the exhaust gases flow through the filter. Also, it may be noted that the structure includes a pair of plenums 38 and 39 inside the ends of the housing 11. These are created by the spaces between the end panels 25 and 24, and the open mesh supports 17 and 16 respectively.

It will be appreciated that the baffles 34 and 35 might take different forms, but in any case they are located in alignment with the inlet and outlet pipes respectively. A preferred structure for these baffles is indicated clearly in FIG. 5. Thus, they may take the form of solid panels of impervious material which extend from the angles 21 and 20, in each case, across the width of the oval shaped housing 11.

A preferred manner of assembling a filter according to this invention, may be in accordance with the following. Taking a fabricated tubular housing 11, the placement of one of the open mesh elements 16 or 17 may be done by appropriate fastening, such as tack welding or the like, to its angle 20 or 21. Then, uncoated steel wool will be placed inside of the housing 11 against the mesh 16 or 17 followed by the installation and by tacking in place of the other mesh. Then, the steel wool will be coated before the ends are put on the housing.

The steel wool coating may be done by using a process such as that described in U.S. Pat. No. 3,231,520. It involves contacting of the steel wool with an appropriate aqueous solution so as to form an adherent film of alumina thereon. Next, the coated steel wool is calcined by heating at an appropriate temperature, and the addition of further catalyst material may be applied.

Finally, the coated mass of filter material will be enclosed in the filter structure by applying the ends 24 and 25 along with the accompanying outlet and inlet pipes 29 and 28 respectively.

It may be noted that a benefit of the structure concerns the fact that direct impingement of the exhaust gases on the coated filter material 15, is prevented by the baffle 34. Also, the lead-salt-laden gases which are part of the exhaust gas passing through the filter, will distribute themselves across the face of the filter bed 15 in the plenum 38 at the inlet end. Furthermore, even should the flow distribution be not completely uniform at the beginning of a filter operation, the salts that are deposited on the filter bed will increase the local back pressure which will force the flow to become more uniformly distributed.

While a particular embodiment of the invention has been described above in considerable detail in accordance with the applicable statutes, this is not to be taken as in any way limiting the invention but merely as being descriptive thereof.

We claim:

1. Automobile type lead filter, comprising in combination an elongated housing having an oval cross section shape and containing a mass of alumina coated steel wool centrally located therein, a pair of open mesh supports extending transversely across the interior of said housing at the ends of said mass for holding it in place, angle means centrally located longitudinally for stiffening said housing to maintain said oval cross section, an inlet pipe located at one end of said housing with the axis thereof offset from the longitudinal axis of the housing, an outlet pipe located at the other end of said housing with the axis thereof aligned with the longitudinal axis of the housing, a pair of impervious baffles integrally attached to said mesh supports and each being aligned with one of said inlet and outlet pipes, said baffles being spaced from the inside ends of said pipes to minimize pressure drops thereat, impervious material end walls on said housing forming a pair of plenums one at each end of said housing between said mesh supports and the end walls, said inlet and outlet pipes extending through said end walls of the housing, and means adjacent to the inside ends of said pipes for supporting the inner ends relative to the walls of said housing.

* * * * *